United States Patent [19]
Yamamoto et al.

[11] Patent Number: 5,937,126
[45] Date of Patent: Aug. 10, 1999

[54] OPTICALLY AMPLIFYING/REPEATING TRANSMISSION SYSTEM AND OPTICAL AMPLIFIER

[75] Inventors: Shu Yamamoto; Noboru Edagawa; Hidenori Taga; Shigeyuki Akiba, all of Tokyo, Japan

[73] Assignee: Kokusai Denshin Denwa Kabushiki Kaisha, Tokyo, Japan

[21] Appl. No.: 08/987,812

[22] Filed: Dec. 10, 1997

[30] Foreign Application Priority Data

Dec. 10, 1996 [JP] Japan .................................. 8-329960

[51] Int. Cl.⁶ ...................................................... G02B 6/02
[52] U.S. Cl. ........................................... 385/123; 359/341
[58] Field of Search ........................... 385/123, 24, 147; 372/6, 44; 359/161, 173, 179, 115, 341, 344

[56] References Cited

U.S. PATENT DOCUMENTS

| | | | |
|---|---|---|---|
| 5,467,218 | 11/1995 | Takeda et al. | 359/341 |
| 5,574,590 | 11/1996 | Edagawa et al. | 359/179 |
| 5,598,491 | 1/1997 | Ohya et al. | 385/123 |
| 5,657,157 | 8/1997 | Lang et al. | 359/341 |
| 5,701,195 | 12/1997 | Chikama | 359/341 |
| 5,710,660 | 1/1998 | Yamamoto et al. | 359/341 |
| 5,764,404 | 6/1998 | Yamane et al. | 359/341 |

*Primary Examiner*—Akm E. Ullah
*Attorney, Agent, or Firm*—Christie, Parker & Hale, LLP

[57] ABSTRACT

An optical transmission system for optical transmission with the capacity of 100 Gb/S over a distance of 9,000 km or more includes an light sending station for outputting an optical signal in the band of 1.55 $\mu$m, and an light receiving station connected to the light sending station by an optical fiber transmission line. The optical fiber transmission line includes a plurality of transmission optical fibers connected by optically amplifying repeaters. Each transmission optical fiber is a single-mode optical fiber having an effective cross-sectional area of 80 $\mu m^2$ or more. Each optically amplifying repeater includes an erbium-doped optical fiber for pumping in 0.98 $\mu$m, WDM coupler for demultiplexing and multiplexing 1.55 $\mu$m and 0.98 $\mu$m wavelengths, optical isolator and gain equalizing filter, which are connected in series, so as to locate output light from an pumping laser for oscillation in 0.98 $\mu$m onto the erbium-doped optical fiber through the WDM coupler.

17 Claims, 6 Drawing Sheets

OPTICALLY AMPLIFYING/REPEATING TRANSMISSION SYSTEM AND OPTICAL AMPLIFIER

FIELD OF THE INVENTION

This invention relates to an optically amplifying/repeating transmission system and an optical amplifier, and more particularly, to those enabling optical fiber transmission for a wide band over a very long distance.

BACKGROUND OF THE INVENTION

Submarine optical cable systems are required to transmit optical signals over a distance longer than thousands of kilometers, and therefore the systems typically use optically amplifying repeaters in predetermined repeating intervals to optically amplify attenuated optical signals.

Optical fibers currently used for transmission have diameters of their cores 8 to 8.5 µm (with effective cross-sectional areas of approximately 50 to 55 µm$^2$), and used as optically amplifying repeaters are erbium-doped optical fibers pumped with 1.48 µm. By combining these elements, transmission of 5 Gb/s over 9,000 km, like optical submarine cable TPC-5 connecting Japan and U.S.A., is currently used in practice.

Transmission capacity can be increased by the number of wavelengths by simultaneously using wavelength-division multiplexing technologies. For example, although depending on the distance of transmission, it has been confirmed that NRZ systems can multiplex five to twenty wavelengths and optical soliton systems can multiplex five to eight wavelengths.

Erbium-doped optical fibers have absorption levels of 1.48 Jim band and 0.9 µm band. Semiconductor lasers for 0.98 µm, however, have been unreliable for use in transmission. Moreover, when such optical fibers are pumped with 0.98 µm, optimum amplifier outputs cannot be set high, taking nonlinear effects into account, as compared with pumping with 1.48 µm. Therefore, the band of 1.48 µm has been employed in practice.

However, signals must be repeated and transmitted, for example, over 9,000 km for directly connecting Japan and U.S.A., and 11,000 km for directly connecting U.S.A. and China. For realizing transmission capacity of 100 Gb/s as a whole by multiplexing 20 wavelengths of optical signals of 5 Gb/s, it is difficult to achieve the optically amplifying/repeating transmission over 9,000 km or more by the combinations of existing optical fiber cables and optical amplifiers.

Assuming that optical transmission fibers have the same transmission loss, it is necessary to increase power of optical signal outputs of optically amplifying repeaters or to greatly decrease the amount of noise of optical amplifiers, in order to increase the transmission distance. However, an increase in power of optical signals accompanies deterioration in transmission characteristics due to nonlinear effects of optical transmission fibers, and expected bands cannot be ensured. It is also difficult to decrease noise with erbium-doped optical fibers pumped by laser light of 1.48 µm.

SUMMARY OF THE INVENTION

It is therefore an object of the invention to provide an optically amplifying/repeating transmission system and an optical amplifier enabling optical transmission of a wide band over a very long distance in excess of 9,000 km.

Another object of the invention is to provide an optical amplifier having both a high reliability and a low-noise property.

According to the invention, optical signals transmitted from optical fiber transmission means having a wider effective cross-sectional area (for example, 80 µm$^2$ or more) are repeated and amplified by optical amplifying/repeating means pumped by a shorter pumping wavelength (for example, 0.98 µm band) as compared with ordinary systems.

The use of a shorter pumping wavelength than ordinary one results in a lower noise figure and a better S/N ratio, and a wider effective cross-sectional area than ordinary one results in a lower nonlinear effect and less deterioration of optical pulses. These factors contribute to realization of an entirely high Q factor, and hence to realization of optical transmission of a large capacity over a very long distance.

An optical amplifier according to the invention mainly uses first pumping means, which is effective for decreasing noise although inferior in reliability, and second pumping means having a high reliability although ineffective for decreasing noise as an auxiliary means. Thus, both a reliability and a low noise property can be accomplished.

DESCRIPTION OF THE PREFERRED EMBODIMENTS

Embodiments of the invention are explained below in detail with reference to the drawings.

Figure 1:
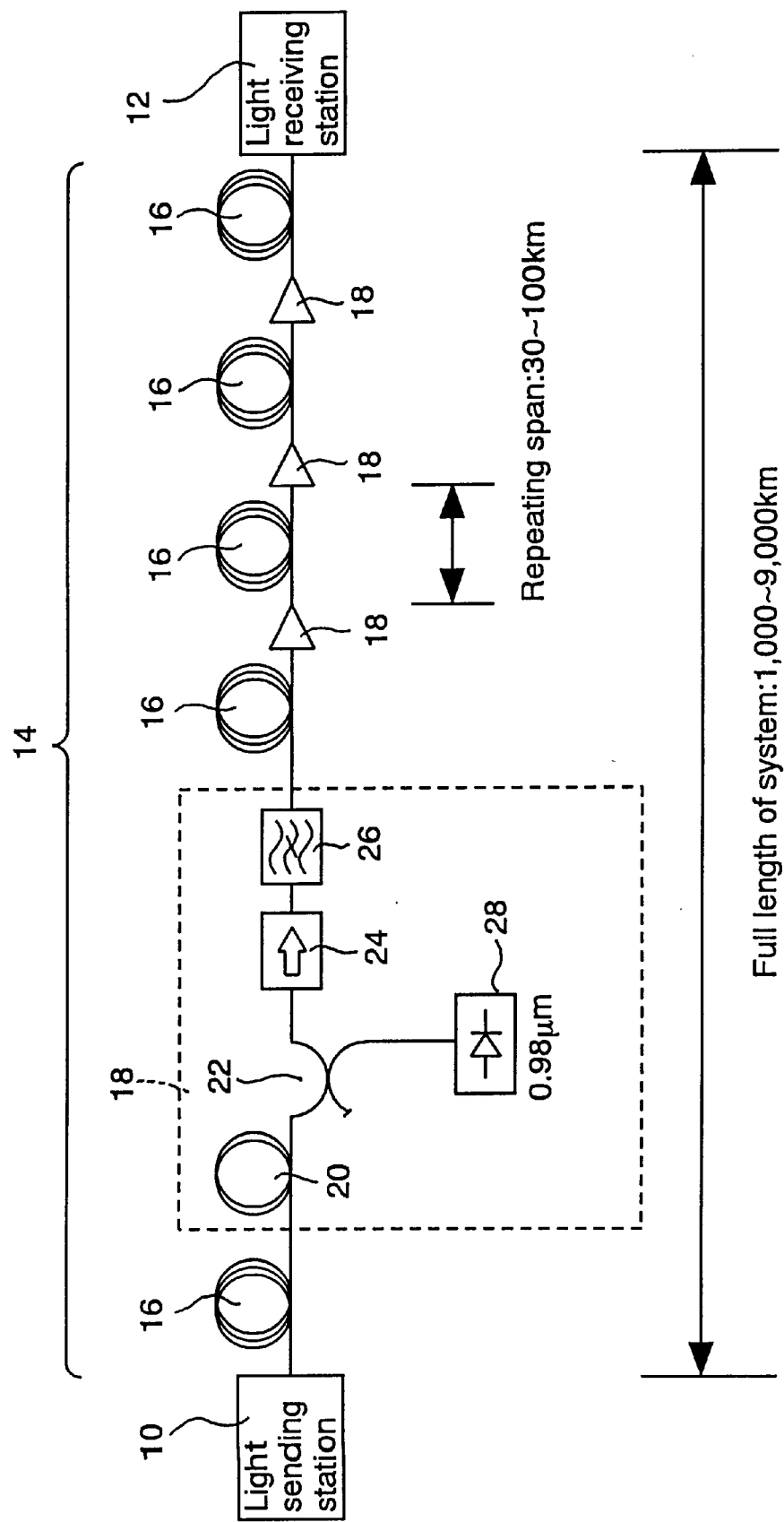
FIG. 1 is a schematic block diagram showing a general construction of a system embodying the invention.

FIG. 1 is a block diagram schematically showing an embodiment of the invention. Reference numeral 10 denotes a light sending station which outputs optical signals in 1.55 µm, and 12 denotes an light receiving station connected to the light sending station by an optical fiber transmission line 14. The optical fiber transmission line 14 includes a plurality of transmission optical fibers 16,16, . . . connected repetitively by optically amplifying repeaters 18. The transmission optical fibers 16 used in this embodiment are single-mode optical fibers whose effective cross-sectional area is 80 m$^2$ or more.

Each of the optically amplifying repeaters 18 includes an erbium-doped optical fiber 20 for pumping in 0.98 µm, WDM coupler 22 for demultiplexing and multiplexing light of 1.5 µm and light of 0.98 µm (pumping light), optical isolator 24 and gain equalizing filter 26, which are connected in series, and light from an pumping laser 28 for laser oscillation in the band of 0.98 µm is supplied through the WDM coupler 22 to the erbium-doped optical fiber 20. The gain equalizing filter 26 equalizes gains of respective optical signal wavelengths in the band of 1.55 µm.

The embodiment is characterized in that the effective cross-sectional area of the transmission optical fiber 16 is as very large as 80 $\mu m^2$ or more as compared with conventionally used ones (approximately 50 $\mu m^2$), and that the wavelength used as light source for pumping of the optically amplifying fiber in the optically amplifying repeater 18 is in the band as very short as 0.98 $\mu m$ as compared with conventionally used ones (in the band of 1.48 $\mu m$). In the other respects, however, the embodiment has basically the same construction as conventional one.

Figure 2:
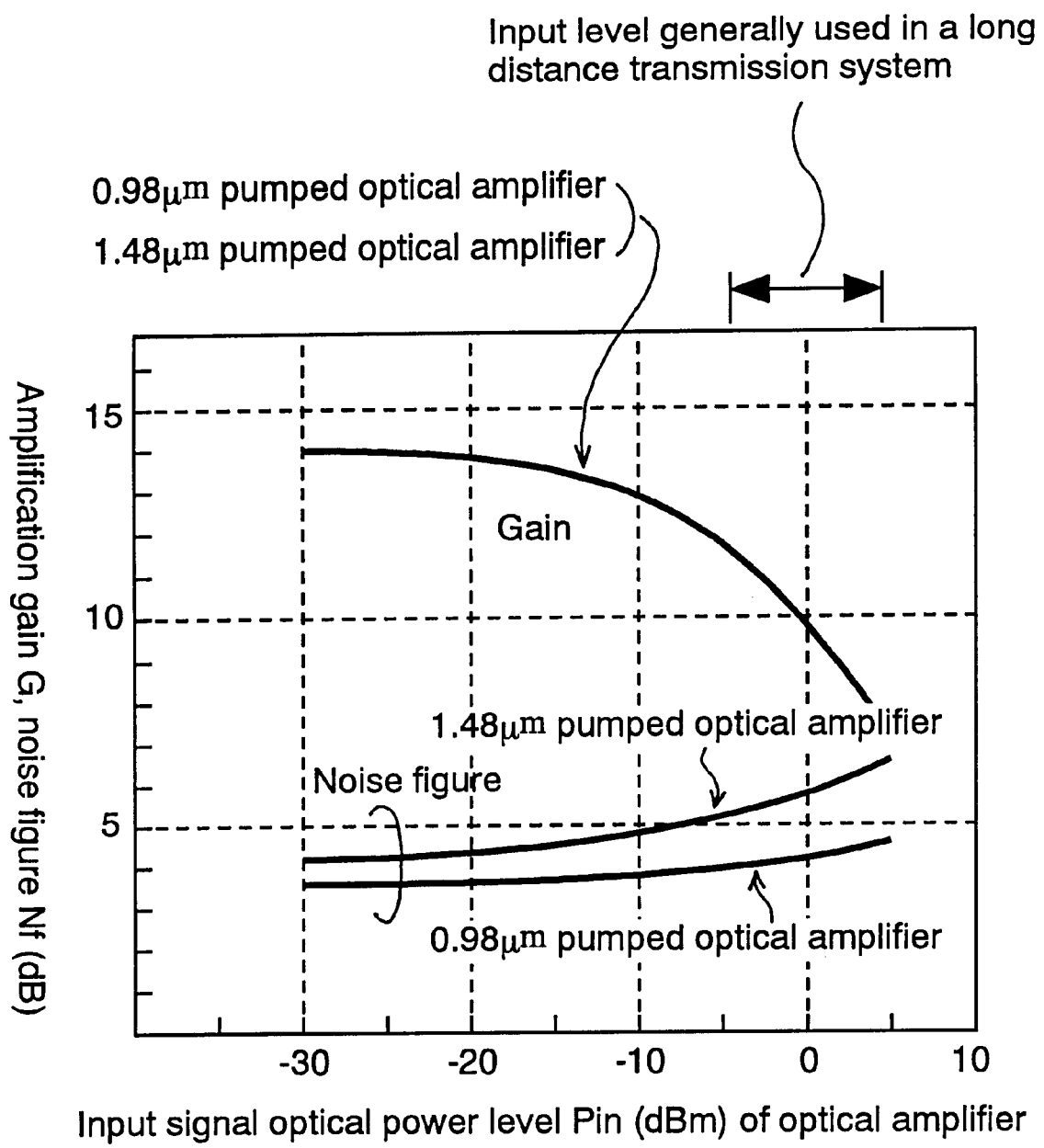
FIG. 2 is a graph showing relations of the input signal optical power level with the amplification gain and the noise figure in an erbium-doped optical fiber.

FIG. 2 shows how the amplification gain and the noise figure of the erbium-doped optical fiber change with the input signal optical power level when the wavelength of the pumping light source is 0.98 $\mu m$ and 1.48 $\mu m$, respectively. The gain exhibits the same values even under different wavelengths of the pumping light source; however, the noise figure exhibits different values under different wavelengths of the pumping light source. For example, when the input signal optical power level is 0 dBm, the noise figure Nf is approximately 6 dB under the pumping wavelength of 1.48 $\mu m$, and approximately 4 dB under the pumping wavelength of 0.98 $\mu m$. That is, the noise figure Nf is improved by 2 dB, and it theoretically means that the distance can be increased by 1.5 times.

Figure 3:
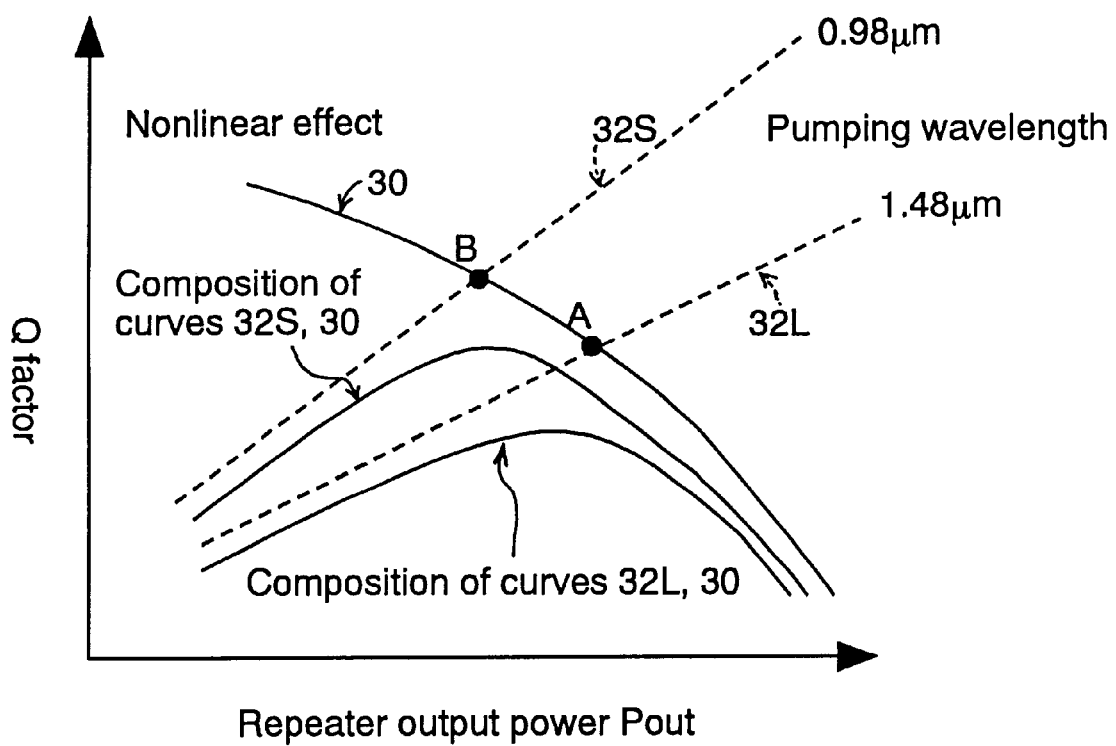
FIG. 3 is a diagram schematically showing changes in characteristics of the Q factor with repeater output power Pout when the pumping wavelength is varied.

In general, qualities of optical fiber lines are estimated in Q factors. The Q factor exclusively depends on nonlinearity of the transmission optical fiber 16 and noise light caused by the optically amplifying repeater 18, and exhibits characteristics as shown in FIG. 3 putting values of the Q factor on the vertical axis and output power Pout of the optically amplifying repeater 18 on the horizontal axis. In terms of the nonlinearity of the transmission optical fiber 16, the Q factors decreases as the repeater output power Pout increases as shown by the curve 30, and the degree of the decrease becomes large as the value of the repeater output power Pout becomes large.

On the other hand, in regard of the noise (namely, signal-to-noise ratio (SIN ratio) or noise figure Nf), since, in general, the S/N ratio becomes better as the repeater output power Pout increases, the Q factor also increases straightforward as the repeater output power Pout increases. However, with regard of the pumping wavelength of the optically amplifying repeater 18 (output wavelength from the pumping laser 28), Q values are smaller and the changing ratio relative to the repeater output power Pout is smaller, when the pumping wavelength is 1.4 $\mu m$ than 0.98 $\mu m$. The curve 32S shows values when the output wavelength of the pumping laser 28 (pumping wavelength) of the optically amplifying repeater 18 is lower, namely 0.98 $\mu m$, and the curve 32L shows values when the pumping wavelength of the optically-amplifying repeater is 1.48 $\mu m$ as conventionally used.

Since the Q factor is synergism of effects of nonlinearity and effects of noise (namely, S/N ratio or noise figure Nf), transmission characteristics are optimum near points A and B where the curve 30 of nonlinear effects crosses the curves 32S and 32L of S/N ratios. In conventional systems, output power Pout of the optically amplifying repeater, which corresponds to point A, was selected.

When the short pumping wavelength, 0.98 $\mu m$, of the optically amplifying repeater 18 is used like the instant embodiment, the cross point B of the curves 30 and 32S is the best point. That is, at point B, the Q factor exhibits a larger value than that at point A, and better transmission characteristics can be expected. Although semiconductor lasers for 0.98 $\mu m$ have conventionally disregarded as being unreliable prior to considering their low-noise properties, low-noise properties are of great importance in recent large-capacity long-distance optical transmission. The problem of reliability is believed soluble by improvements of semiconductor manufacturing technologies.

Recently, effective cross-sectional areas Aeff of transmission optical fibers are considered important, and optical fibers having effective cross-sectional areas Aeff of 80 $\mu m^2$ or more have been studied and reported. As the effective cross-sectional area Aeff increases, the optical power density per a unit area and the nonlinear effect decrease. That is, pulse waveforms are less likely to degrade, better transmission characteristics are expected than smaller effective cross-sectional areas Aeff.

Figure 4:
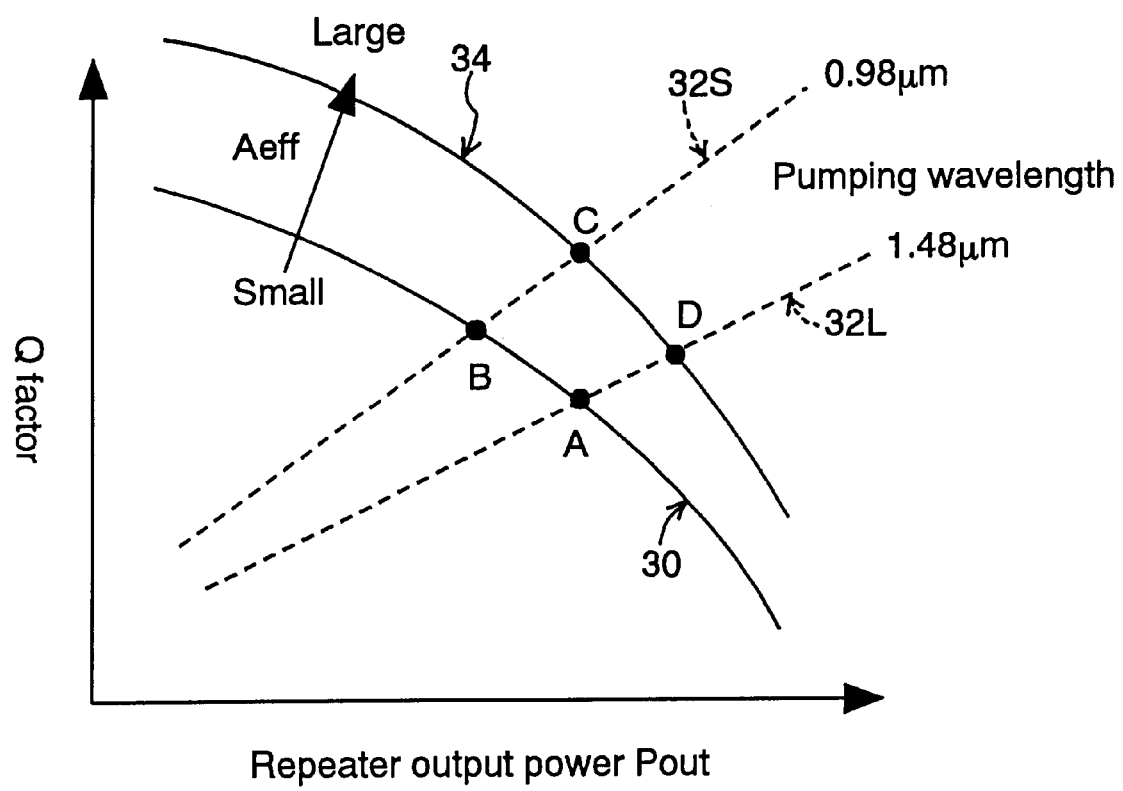
FIG. 4 is a diagram schematically showing changes in characteristics of the Q factor with repeater output power Pout when the pumping wavelength and the effective cross-sectional area Aeff are varied.

FIG. 4 shows characteristics, similar to FIG. 3, obtained when the effective cross-sectional area Aeff is 80 $\mu m^2$ or more. Although the curve 30 shows characteristics of nonlinear effects in case of the effective cross-sectional area Aeff being approximately 50 $\mu m^2$, the curve 34 shows characteristics of nonlinear effects in case of the effective cross-sectional area Aeff being 80 $\mu m^2$, for example. As schematically shown by curves 30 and 34, the Q factor is improved as the effective cross-sectional area Aeff increases.

Therefore, by using the short pumping wavelength for the optically amplifying repeater 18 and increasing the effective cross-sectional area Aeff of the transmission optical fiber 16, the cross point C of the curves 34 and 32S is the best point. The Q value corresponding to the cross point C is undoubtedly higher than Q values corresponding to points B and A. That is, the quality of the transmission line is better. Additionally, since the repeater output power Pout corresponding to point C is larger than the repeater output power Pout corresponding to point B, the repeater output power Pout can be made larger than the value obtained by simply shortening the pumping wavelength of the optically amplifying repeater, and the Q factor becomes large accordingly.

As FIGS. 3 and 4 also show, in the range of shorter pumping wavelengths, the inclination of the Q factor relative to the output power Pout of the optically amplifying repeater is larger. Therefore, displacement of the cross point with a larger effective cross-sectional area Aeff is becomes larger as the pumping wavelength becomes shorter. That is, the shorter the pumping wavelength, the larger the effects of improvement of the Q factor relative to the effective cross-sectional area Aeff.

Even when using the conventionally used pumping wavelength of 1.48 $\mu m$, the cross point D of curves 32L and 34 is rendered the optimum point by enlarging the effective cross-sectional area Aeff of the transmission optical fiber, and a larger Q factor value compared to that at point A can be obtained. However, since the inclination of the curve 32L is small in the range of long pumping wavelengths, the effects of improvement of the Q factor by increasing the effective cross-sectional area Aeff is small, and it is impossible to obtain Q factor values large enough to realize transmission over a very long distance exceeding 9,000 km in 100 Gb/s.

Figure 5:
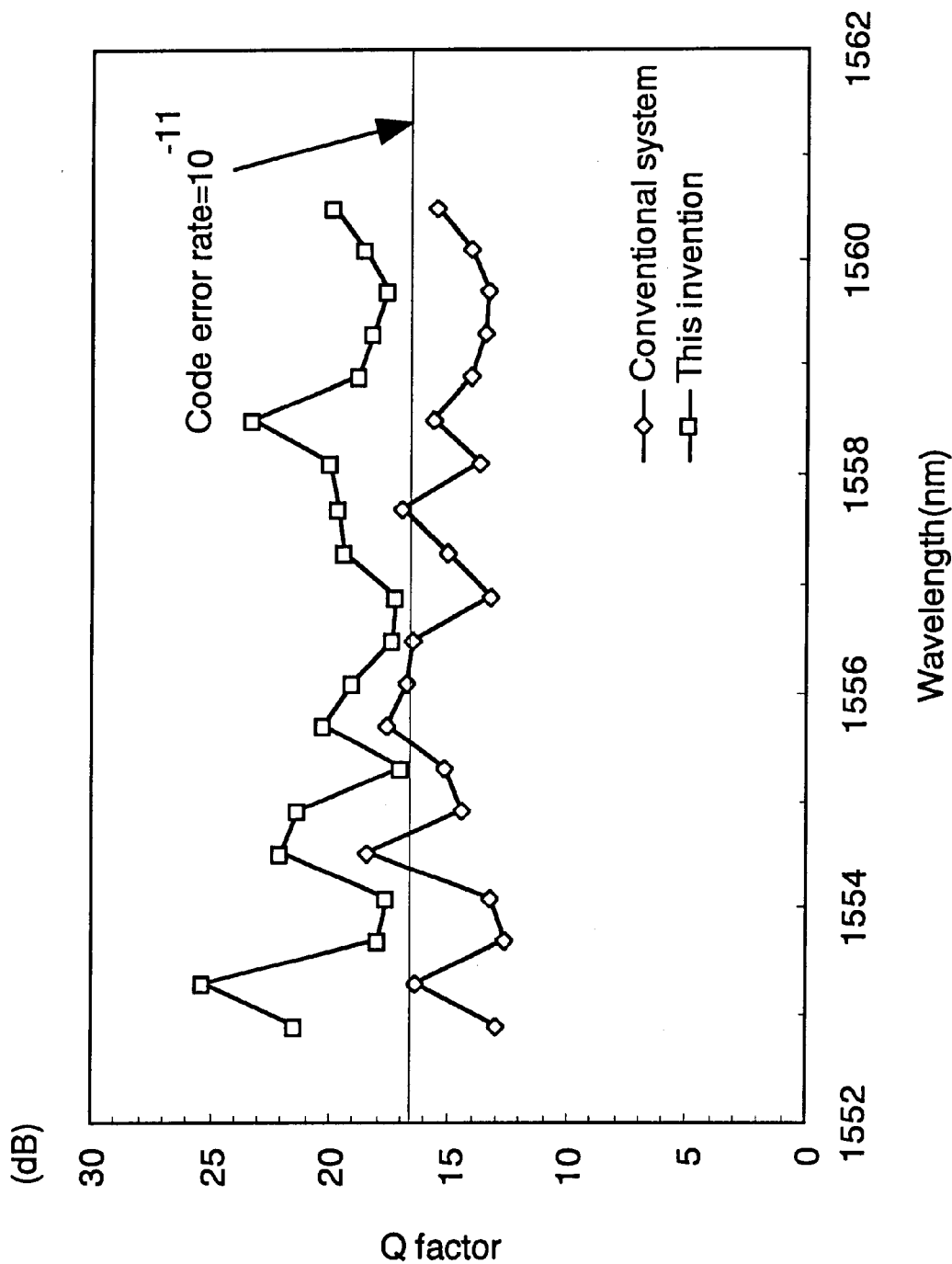
FIG. 5 is a diagram results of comparative computer simulation of an existing system and a system according to the invention in transmission of 9,000 km in 100 Gb/s (5 Gb/s×20 wavelengths)

FIG. 5 shows results of computer simulation of 9,000 km transmission of wavelength-multiplexed signals containing 20 wavelengths in 5 Gb/s. White square boxes are plots of a system according to the embodiment (using transmission optical fibers with the effective cross-sectional area of 80 $\mu m^2$ and 0.98 $\mu m$ as the pumping wavelength of the optically amplifying repeater), and white rhomboidal boxes are plots of a conventional system (using transmission optical fibers with the effective cross-sectional area of 55 $\mu m^2$ and the wavelength of 1.48 μm for pumping of the optically amplifying repeater). Used as the repeater output power is 7 dBm. It is understood from FIG. 5 that the remarkable effect of improvement is obtained and that the embodiment ensures a code error rate of $10^{-11}$ or less for any wavelengths in 9,000 km transmission.

The embodiment has been describes as using 0.98 μm as the pumping wavelength and using transmission optical fibers 16 having an effective cross-sectional area Aeff of 80 μm$^2$ or more. However, these numerical limitations are not absolute or critical. That is, the Q factor can be improved, more or less, also with other values slightly shifted from these values, as apparent from the schematic diagram of FIG. 4.

Improvements of technologies for crystallographic growth will improve the reliability of semiconductor lasers for the band of 0.98 μm well acceptably for use in transmission. However, in the optically amplifying repeater 18 shown in FIG. 1, if the 0.98 μm pumping laser 28 deteriorates until no or weak pumping light is supplied to the erbium-doped optically amplifying fibers 20, transmitted light will be greatly attenuated at the erbium-doped optical fibers 20 and possibly interrupted there. Explained below is an another version of the optically amplifying repeater 18 realizing both a reliability in transmission without interruption and a low noise property by pumping in the band of 0.98 μm, referring to the block diagram of FIG. 6 showing its general construction.

Figure 6:
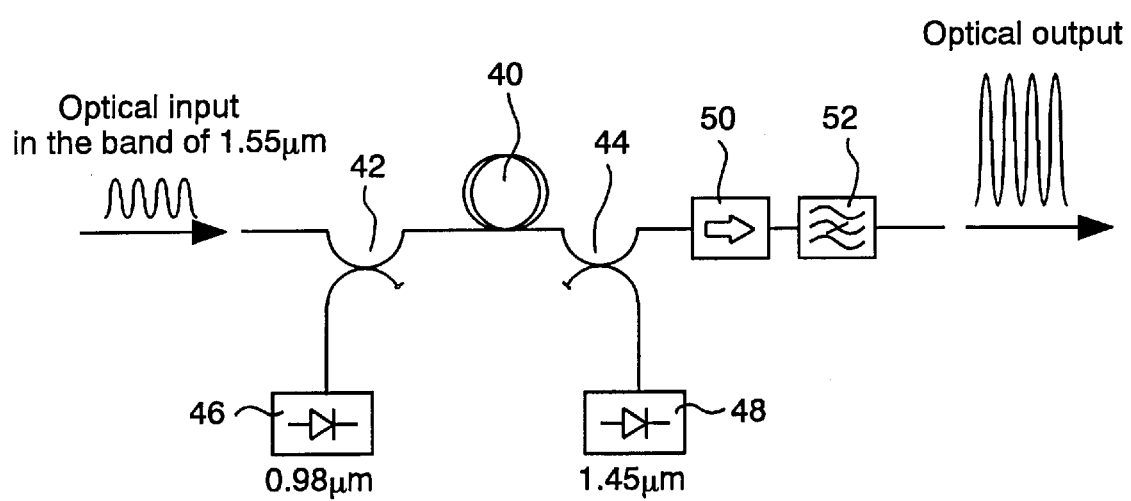
FIG. 6 is a schematic block diagram of an alternative construction of an optically amplifying repeater 18.

In FIG. 6, reference numeral 40 denotes erbium-doped optical fibers optimized for pumping in 0.98 μm and having one end connected to a 1.55 μm/0.98 μm wavelength-division multiplexing coupler 42 and the opposite end connected to a 1.55 μm/1.45 μm wavelength-division multiplexing coupler 44. Output light (0.98 μm pumping light) from the 0.98 μm pumping laser 46 is cross-coupled in the 1.55 μm/0.98 μm wavelength-division multiplexing coupler 42 and enters into the erbium-doped optical fiber 40. Output light (1.45 μm pump light) from the 1.45 μm pumping laser 48 is cross-coupled in the 1.55 μm/1.45 μm wavelength-division multiplexing coupler 44 and enters into the erbium-doped optical fiber 40.

Transmission light to be amplified, e.g., signal light in the band of 1.55 μm, passes through the wavelength-division multiplexing coupler 42 and enters into the erbium-doped optical fiber 40. The erbium-doped optical fiber 40 pumped by output light from the lasers 46 and 48 optically amplifies the input signal light, and amplified output light from the optical fiber 40 passes through the wavelength-division multiplexing coupler 44 and is supplied to the optical transmission line through an optical isolator 50 and a gain equalizing filter 52. The amplification gain of the erbium-doped optical fiber 40 usually exhibits moderate arcuate characteristics, and the gain equalizing filter 52 adjusts the arcuate amplification characteristics into a flat form to substantially equalize signal light intensities of respective wavelengths.

Since the present invention mainly aims reduction of noise for transmission over a very long distance, the erbium-doped optical fiber 40 is optimized for the band of 0.98 μm with less noise. Low reliability of the 0.98 μm pumping laser 46 is compensated by additionally using the 1.45 μm pumping laser 48. Thus, the embodiment can attain both a low noise property and a high reliability.

Pumping in 1.45 μm is lower in pumping efficiency than pumping in 1.48 μm. However, it gives substantially no adverse affection to pumping in 0.98 μm. Therefore, when the erbium-doped optical fiber 40 is pumped by both pumping lasers 46, 48 simultaneously, 0.98 μm pumping operates as the leading part, and attains low-noise characteristics. In an actual trial using a 20 m-long erbium doped optical fiber and pumping it by the 0.98 μm laser in 50 mW and the 1.45 μm laser in 40 mW, noise figures in the range of 3.5 to 3.7 dB were attained in the signal wavelength band of 1,540 nm to 1,560 nm. These values are substantially the same as the value obtained by using the 0.98 μm laser 46 alone.

In the embodiment shown in FIG. 6, if the 0.98 μm pumping laser 46 is deteriorated, then no or extremely weak pumping light of 0.98 μm is obtained. In this case, 1.45 μm pumping by he 1.45 μm pumping laser 48 behind it plays the leading role. When 1.45 μm pumping plays the leading role, the low noise property attained by pumping in 0.98 μm is not expected, but a sufficiently large amplification ratio is obtained. In the repeating transmission system connecting a plurality of optical amplifiers in multiple steps, interruption of signal light within the system is a severe trouble. In regard of the noise figure, however, a decrease in noise figure in part of the optical amplifiers causes only a slight deterioration in the entire transmission characteristics, and such a slight deterioration can be absorbed into the characteristic margin of the transmission system. Since the 1.45 μm pumping laser 48 has a reliability equivalent to that of an existing 1.48 μm pumping laser, a remarkably high reliability is attained in the entire system.

In the embodiment shown in FIG. 6, the 0.98 μm pumping laser 46 is positioned in front of the erbium-doped optical fiber, and the 1.45 μm pumping laser 48 behind it. In this manner, the 1.45 μm pumping light of a wavelength near to signal light travels in the opposite direction from the signal light, and affection to the signal light can be alleviated.

Since erbium-doped optical fibers typically used as optically amplifying means have available absorption levels (or corresponding energy levels) of 1.48 μm and 0.98 μm, the embodiment shown in FIG. 1 uses the band of 0.98 μm whilst the embodiment shown in FIG. 6 employs both 0.98 μm and 1.45 μm. In case of other optically amplifying mediums, in general, wavelengths of their absorption levels will be different from those values. The present invention is applicable also to systems using other optically amplifying medium. In such applications, the optically amplifying medium may be pumped by using a wavelength corresponding to a higher absorption level among a plurality of absorption levels belonging to a wavelength band lower than that of the signal light. When auxiliary pumping light is required, a wavelength slightly shorter than that corresponding to a lower absorption level can be used as the auxiliary pumping light.

Those skilled in the art will readily understand from the foregoing description that the invention realizes an optical fiber transmission system with the total transmission capacity of 100 Gb/s or more over a very long distance exceeding 9,000 km and that optical amplification satisfying both a reliability and a low noise property can be realized.

What is claimed is:

1. An optically amplifying/repeating transmission system comprising optical fiber transmission means having an effective cross-sectional area greater than 50 μm$^2$; and optically amplifying/repeating means excited with an exciting wavelength shorter than 1.48 μm for repeating and amplifying an optical signal transmitted through said optical fiber transmission means.

2. The optically amplifying/repeating transmission system according to claim 1 wherein said effective cross-sectional area of said optical fiber transmission means is approximately 80 μm$^2$ or more.

3. The optically amplifying/repeating transmission system according to claim 1 wherein said optically amplifying/repeating means comprises an optically amplifying medium having a plurality of absorption levels belonging to a shorter wavelength band than a wavelength of said optical signal, and exciting means for exciting said optically amplifying medium in said exciting wavelength, said exciting wavelength corresponding to one of said absorption levels.

4. The optically amplifying/repeating transmission system according to claim 3 wherein said optically amplifying medium comprises erbium-doped optically amplifying fibers.

5. The optically amplifying/repeating transmission system according to claim 4 wherein said exciting wavelength is substantially in the band of 0.98 $\mu$m.

6. The optically amplifying/repeating transmission system according to claim 1 wherein:

said exciting wavelength includes a first pumping wavelength and a second pumping wavelength;

said optically amplifying/repeating means comprises an optically amplifying medium having a plurality of absorption levels belonging to a wavelength band shorter than a wavelength of said optical signal, first pumping means for pumping said optically amplifying medium in said first pumping wavelength, and second pumping means for pumping said optically amplifying medium in said second pumping wavelength;

said first pumping wavelength corresponding to one of said absorption levels; and said second pumping wavelength being shorter than a wavelength corresponding to a second one of said absorption levels, said second one of said absorption levels having a lower energy than said one of said absorption levels.

7. The optically amplifying/repeating transmission system according to claim 6 wherein said optically amplifying medium comprises erbium-doped optically amplifying fibers.

8. The optically amplifying/repeating transmission system according to claim 7 wherein said first pumping wavelength is substantially in the band of 0.98 $\mu$m and said second pumping wavelength is substantially in the band of 1.45 $\mu$m.

9. The optically amplifying/repeating transmission system according to one of claims 1 through 8 wherein said optical signal has a wavelength substantially in the band of 1.5 $\mu$m.

10. An optically amplifying/repeating transmission system comprising optical fiber transmission means having an effective cross-sectional area of approximately 80 $\mu^2$ or more, and optically amplifying/repeating means pumped substantially in the band of 0.98 $\mu$m for repeating and amplifying an optical signal substantially in the band of 1.5 $\mu$m transmitted through said optical fiber transmission means.

11. An optically amplifying/repeating transmission system comprising optical fiber transmission means having an effective cross-sectional area of approximately 80 $\mu m^2$ or more, and optically amplifying/repeating means pumped substantially in the bands of 0.98 $\mu$m and 1.45 $\mu$m for repeating and amplifying an optical signal substantially in the band of 1.5 $\mu$m transmitted through said optical fiber transmission means.

12. An optical amplifier for amplifying an optical signal, comprising:

an optically amplifying medium having a plurality of absorption levels belonging to a wavelength band shorter than the wavelength of the optical signal;

first pumping means for pumping said optically amplifying medium in a first pumping wavelength; and second pumping means for pumping said optically amplifying medium in a second pumping wavelength, said first pumping wavelength corresponding to one of said absorption levels, and said second pumping wavelength being shorter than a wavelength corresponding to a second one of said absorption levels, said second one of said absorption levels having a lower energy than said one of said absorption levels.

13. The optical amplifier according to claim 12 further comprising first coupling means for introducing output light from said first pumping means into said optically amplifying medium, and second coupling means for introducing output light from said second pumping means into said optically amplifying medium.

14. The optical amplifier according to claim 12 wherein said optically amplifying medium comprises erbium-doped optically amplifying fibers.

15. The optical amplifier according to claim 12 wherein said first pumping wavelength comprises the band of substantially 0.98 $\mu$m, and said second pumping wavelength comprises the band of substantially 1.45 $\mu$m.

16. The optical amplifier according to claim 12 wherein said optical signal has a wavelength substantially in the band of 1.5 $\mu$m.

17. An optical amplifier comprising:

an optically amplifying medium;

main pumping means for pumping said optically amplifying medium; and auxiliary pumping means for pumping said optically amplifying medium, said auxiliary pumping means having a higher reliability than said main pumping means, and said auxiliary pumping means activating said optically amplifying medium with higher noise than said main pumping means.

* * * * *